Aug. 9, 1927.

K. SCHERER 1,638,062

AUTOMOBILE LOCK

Filed April 8, 1925

Inventor
KARL SCHERER.
By his Attorney

Patented Aug. 9, 1927.

1,638,062

UNITED STATES PATENT OFFICE.

KARL SCHERER, OF NEW YORK, N. Y.

AUTOMOBILE LOCK.

Application filed April 8, 1925. Serial No. 21,561.

This invention relates to automobile locks and more particularly it is directed to an improved locking device for preventing theft of an automobile or other like vehicle.

An object of the invention is to provide an improved device of the character described which is adapted to releasably lock the vehicle brakes in an effective position for preventing theft of the vehicle.

Another object of the invention is the provision of a device of the character described comprising few and simple parts, inexpensive to manufacture, easy to install, and practical and efficient to a high degree.

Other objects of this invention will in part be obvious and in part hereinafter pointed out.

The invention accordingly consists in the features of construction, combinations of elements and arrangement of parts which will be exemplified in the construction hereinafter described and of which the scope of application will be indicated in the following claims.

In the accompanying drawing, in which is shown one of the various possible illustrative embodiments of this invention, Fig. 1 is a plan view of a vehicle chassis showing an embodiment of the invention applied thereto;

Figure 1:
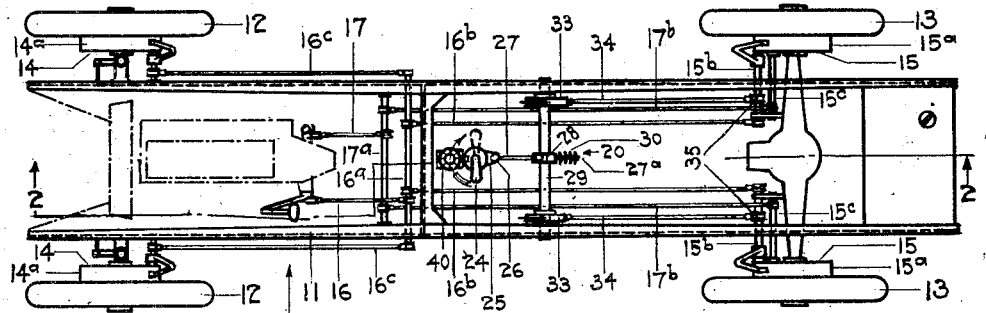

Referring in detail to the drawing, 10 denotes an automobile chassis of any standard construction and is seen to comprise a main frame 11 supported on a suitable running gear which includes front wheels 12, rear wheels 13, said wheels being provided with braking mechanisms 14 and 15 respectively, and the usual operating control means, only the foot-brake and emergency brake, operated by a foot lever 16 and a hand lever 17 respectively being shown.

Actuation of the brake foot lever 16 controls the braking operation of the vehicle in the well known manner through a main cross rock shaft 16$^a$ mounted transversely of a mid-portion of the chassis 10, rearwardly extending adjustable rods 16$^b$ which interconnect the shaft 16$^a$ with the braking mechanism 15, and forwardly extending adjustable rods 16$^c$ which connect said shaft 16$^a$ to the braking mechanism 14.

Similarly the emergency brake lever 17 provides control means for making the rear braking mechanism 15 effective through a cross rock shaft 17$^a$ mounted transversely of the frame 11 adjacent the foot brake rock shaft 16$^a$ and rearwardly extending adjustable rods 17$^b$ which interconnect the shaft 17$^a$ with the braking mechanisms 15.

The braking mechanisms 14 and 15 are of any standard construction and may comprise external brake bands 14$^a$ and 15$^a$ respectively which are controlled by the foot lever 16 through said rods 16$^g$, 16$^b$ and rock member 14$^b$ and 15$^b$ respectively, the latter being arranged to directly actuate the said brake bands. The emergency lever 17 controls the rear braking mechanism 15 only and may co-operate through said rods 17$^a$ to actuate rock member 15$^c$ which are adapted to directly actuate the internal braking device (not shown).

Figure 2:
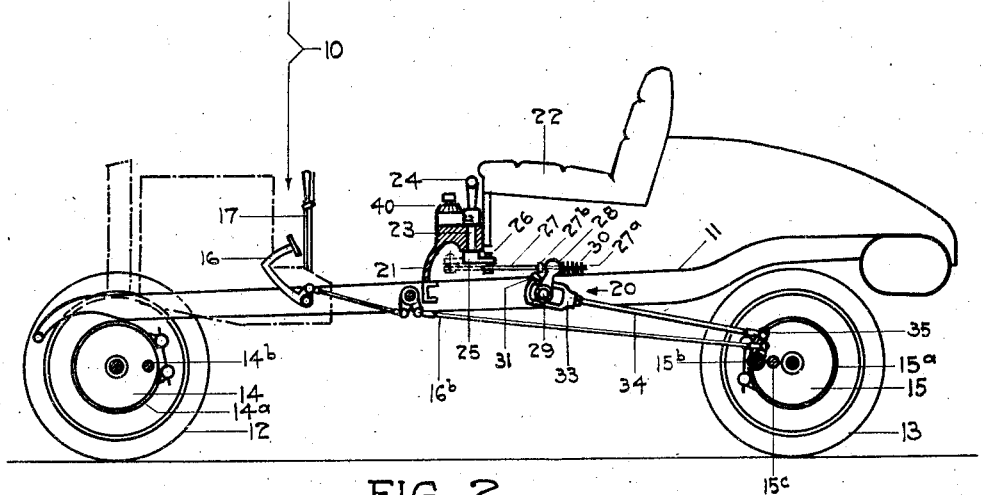
Fig. 2 is a cross-sectional view taken on line 2—2 on Fig. 1.

The improved locking device embodying the invention indicated in general at 20 may be installed to control either the external brake bands 14$^a$, 15$^a$, or the internal braking portion of mechanism 15 and is here shown as applied to co-operate with said external bands. Said device 20 may comprise a support member 21 of suitable construction which is rigidly secured to the frame work of the chassis 10, preferably adjacent the operator's seat 22 as shown in Fig. 2, a vertically extending shaft 23 journalled in said member 21 having an operating handle 24 at one end and a crank arm 25 at the other end.

Connecting with the free end of crank arm 25 by means of a wrist pin 26, a rod 27 is provided having one end thereof pivoted on the pin 26, the other end 27$^a$ extending through the free end of an arm 28 adjacent a stop nut 27$^b$, said arm 28 being rigidly fastened to a rock shaft 29. The extending shaft end 27$^a$ is arranged to carry a "take up" compression spring 30 interposed between the extreme end of the shaft 27 and the arm 28 as shown in Fig. 2.

The shaft 29 is suitably mounted for rotation transversely of the mid-portion of the chassis frame 11 and has pawls 31 rigidly secured to the ends thereof by any suitable means as for example keys 32.

To co-operate with each pawl 31 there is provided a loose link 33 having an elongated opening 33ª therein, for receiving the hub extension 31ª of the pawl 31, said link 33 also having a slotted portion 33ᵇ wherethrough the free end of the pawl 31 is adapted to swing for the purpose hereinafter to appear.

A suitable thrust rod 34 adjustable for length may have one end threaded into the link 33 and the other end pivoted to the free end of a rock lever 35, the latter being secured to the member 15ᵇ for operating the brake band 15ª.

Figures 3, 4:
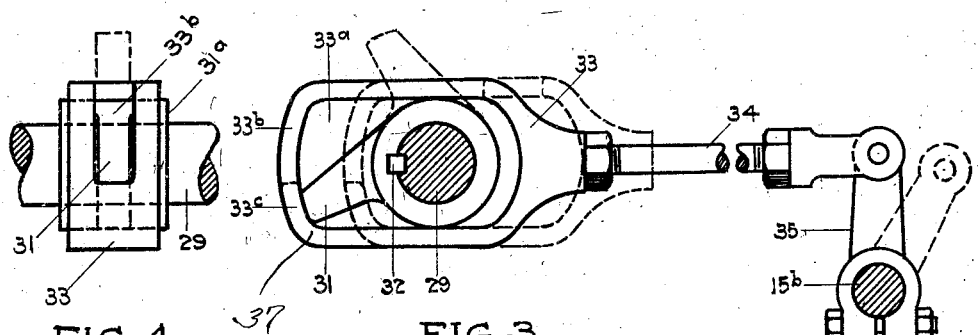
Fig. 3 is an enlarged detailed side elevational view of the thrust rod, open link and pawl portions of the lock device embodying the invention.
Fig. 4 is a side view of the open link shown in Fig. 3.

The vehicle locking operation of the device 24 will now be explained. With the parts in the position shown in Fig. 2 corresponding to the "off" or ineffective position, the spring 30 presses the arm 28 against the stop nut 27 for holding the pawl 31 lifted out of engagement with link 37 as shown in the dotted lines in Fig. 3.

It is clear that the actuation of the foot lever 16 for making the brake bands 15ª effective will not in any way be interfered with while the device 24 is in "off" position since the link 33 and thrust rod 34 are permitted limited free movement with respect to the rock shaft 29 because of the non-engagement of the pawls 31 with said link.

To lock the brakes in effective position, either the foot lever 16 is operated to apply the brakes and the handle 24 rotated to the position shown in dotted lines in Fig. 1 for swinging the arm 28 forward and pressing the pawls 31 to interlock with a portion 33ᶜ of the link 33 below the slot 33ᵇ or the handle 24 may first be rotated and the foot lever 16 operated thereafter for causing the pawls 31 to snap into interlocking position with said portion 33ᶜ on movement of the link 33 on operation of the foot brake.

The device 20 when in its "on" or effective position positively prevents the release of the brakes after the interlockment of the link 33 with the pawl 31, the thrust rods 34 then forming a bracing structure against the chassis frame 11 which is strong and rigid. The portions of the device 24 controlling the pawls 31 are thus relieved from all stress and strains.

A suitable key or combination lock 40, preferably the latter, may be incorporated in the member 21 and is adapted in the well known manner to engage with the handle 24 or shaft 23 for locking the device 20 in its effective position against operation by persons other than those having the proper key or combination.

To release the device 20 the lock is released and the handle 24 is rotated to the position shown in full lines in Figs. 1 and 2 at which time the foot lever 16 is again made effective for operation of the brake band 15ª.

It is to be understood that the device 20 may be equally well applied to vehicles having only rear wheel brakes in which case the front brakes and connections are omitted.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:—

1. In a vehicle having wheel brake mechanism, a device adapted to be mounted on the vehicle frame for releasably locking said mechanism to said frame, said device including a rock shaft mounted on the frame, a pawl carried by the shaft, a thrust rod having one end connected to the said mechanism, the other end of the rod having means for releasably engaging said pawl, and manually operated means for controlling said pawl and thrust rod engagement to selectively lock or release said device.

2. In a vehicle having wheel brakes, manually operated means for controlling said brakes, and a device connected to said brakes independently of said means and actuated by the latter to releasably lock the brakes to the vehicle frame.

3. In a vehicle, the combination of a wheel brake mechanism, means for controlling said mechanism, and a device for releasably retaining the mechanism in effective position, said device including a compression bracing member for locking the said mechanism to a rigid portion of the vehicle.

In testimony whereof I affix my signature.

KARL SCHERER.